United States Patent
Plaideau et al.

(10) Patent No.: US 9,126,627 B2
(45) Date of Patent: Sep. 8, 2015

(54) DEVICE FOR CONTROLLING A POSITION SENSOR OF THE STEERING WHEEL OF AN AUTOMOBILE

(75) Inventors: Michel Plaideau, Presles (FR); Philippe Bettan, Ermont (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 604 days.

(21) Appl. No.: 13/133,567

(22) PCT Filed: Dec. 15, 2009

(86) PCT No.: PCT/EP2009/067224
§ 371 (c)(1),
(2), (4) Date: Jun. 8, 2011

(87) PCT Pub. No.: WO2010/069974
PCT Pub. Date: Jun. 24, 2010

(65) Prior Publication Data
US 2011/0238266 A1      Sep. 29, 2011

(30) Foreign Application Priority Data
Dec. 18, 2008   (FR) ...................................... 08 07128

(51) Int. Cl.
*B62D 15/02*         (2006.01)

(52) U.S. Cl.
CPC .......... *B62D 15/021* (2013.01); *B62D 15/0235* (2013.01)

(58) Field of Classification Search
CPC ............ B62D 1/02; B62D 1/181; B62D 5/00; B62D 5/04; B62D 5/0481; B62D 5/0457; B62D 6/08; B62D 6/10; B62D 15/021; B62D 15/02; B60G 2204/114; B60G 2400/412; B60G 2400/46; B60W 10/20; B60W 2422/50; B60W 2710/20; G01D 5/2451

USPC ............ 180/443, 446; 73/117.02; 701/41–44; 327/544
See application file for complete search history.

(56) References Cited

U.S. PATENT DOCUMENTS

| | | | |
|---|---|---|---|
| 8,164,327 B2* | 4/2012 | Hoskins et al. .......... 324/207.25 |
| 2004/0050177 A1* | 3/2004 | Grosjean .................. 73/862.325 |
| 2005/0109556 A1* | 5/2005 | Kubota et al. ................. 180/446 |
| 2005/0242757 A1* | 11/2005 | Biamonte et al. ............... 318/61 |
| 2008/0048772 A1* | 2/2008 | Nishikawa ..................... 327/544 |
| 2010/0063609 A1* | 3/2010 | Kohring ........................ 700/108 |

FOREIGN PATENT DOCUMENTS

| | | | |
|---|---|---|---|
| DE | 101 45 884 A1 | 4/2003 | |
| DE | 10 2005 009489 A1 | 8/2006 | |
| DE | 10 2007 052099 A1 | 6/2008 | |
| EP | 0 924 491 A1 | 6/1999 | |
| GB | 2443525 * | 5/2008 | ............... B62D 5/04 |
| GB | 2443525 A * | 5/2008 | |
| WO | 2007/068765 A1 | 6/2007 | |

OTHER PUBLICATIONS

International Search Report issued in PCT/EP2009/067224, mailed on Apr. 19, 2010, with translation, 6 pages.

* cited by examiner

*Primary Examiner* — Thomas G Black
*Assistant Examiner* — Sara Nelson
(74) *Attorney, Agent, or Firm* — Osha Liang LLP

(57) ABSTRACT

The invention relates to a device (2) for controlling a position sensor (13) of a steering wheel (3) of a vehicle. Said device (2) includes a means (9) for generating a control signal for the acquisition periods of the position sensor (13) when the vehicle is stopped, the frequency of said signal increasing upon the detection of a variation in the position of said steering wheel (3). The invention can be used in the field of automobiles, and the position sensor can be associated with the rotor of the steering assist motor.

5 Claims, 1 Drawing Sheet

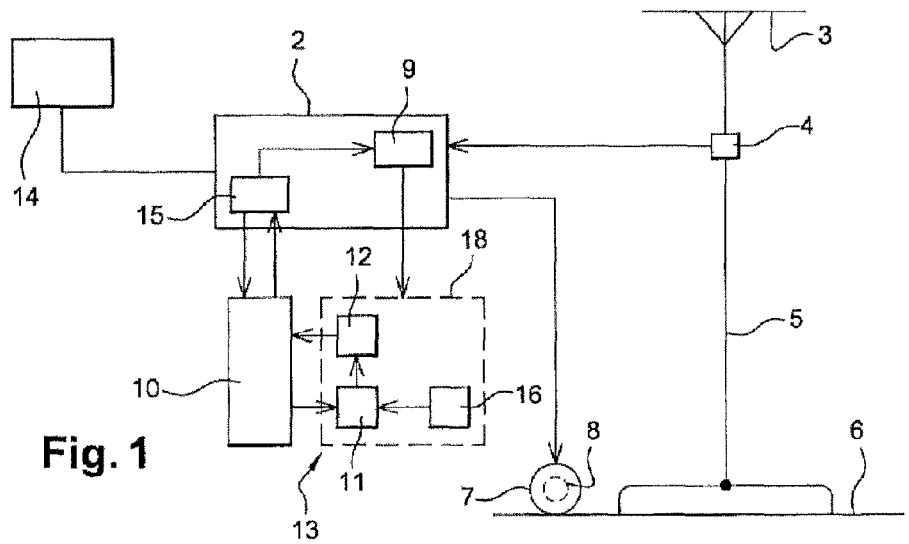
Fig. 1
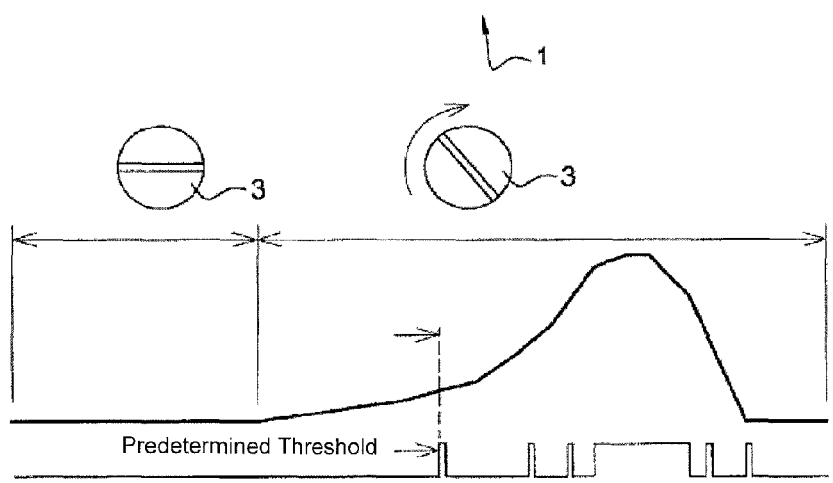
Fig. 2A
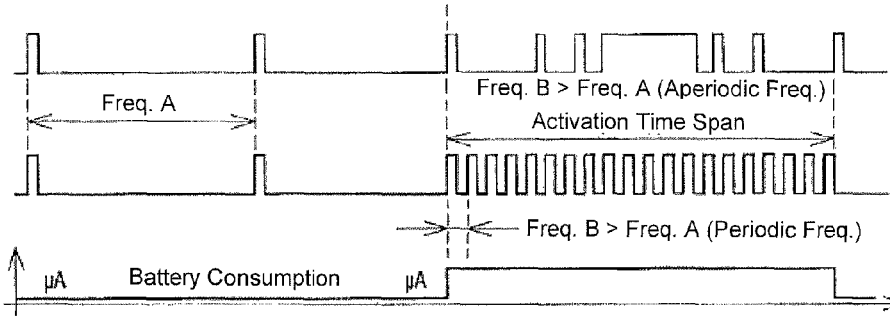
Fig. 2B
Fig. 2C
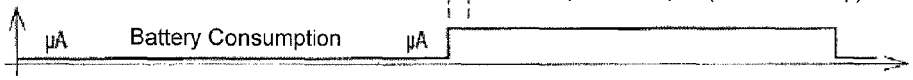
Fig. 2D

DEVICE FOR CONTROLLING A POSITION SENSOR OF THE STEERING WHEEL OF AN AUTOMOBILE

BACKGROUND OF THE INVENTION

The present invention relates to a device for controlling a position sensor of a motor vehicle fitted with a power-steering motor.

The vehicles of today are fitted increasingly frequently with a power-steering motor. Such vehicles comprise a steering system formed by a steering column supporting at its top end a steering wheel capable of being actuated by the driver of the vehicle, a rack on which the bottom end of the steering column acts and a power-steering motor mechanically connected to the rack. An electronic management system of the ECU (electronic control unit) type controls the power-steering motor in order to prevent the steering of the vehicle becoming too light at normal speed or too heavy at virtually zero speed.

For the correct operation of the power-steering motor, it is necessary to have an item of information reflecting the angular position of the steering wheel in order to perform the function of automatic return of the steering wheel. This information is usually supplied by a steering-wheel sensor situated on the steering wheel. The presence of a steering-wheel sensor dedicated to this function however causes a considerable extra cost.

The angular position of the steering wheel of a vehicle may also be obtained by virtue of a position sensor situated on the power-steering motor.

However, the use of this type of sensor poses certain problems. Specifically, the position of the steering wheel must be known at all times (i.e. when stationary and when running). Accordingly, it is necessary to keep the position sensor of the power-steering motor powered up even if the ignition of the vehicle is switched off. Keeping powered up in this way causes a risk of discharging the battery.

In this context, the object of the invention is to remedy the aforementioned problems of the prior art by proposing a device capable of determining, when the ignition of the vehicle is switched off, the angular position of the steering wheel, with precision and exactitude, while ensuring minimum electrical consumption and while preventing a risk of discharging the battery of the vehicle.

BRIEF SUMMARY OF THE INVENTION

For this purpose, the invention proposes a device for controlling a sensor of the position of a steering wheel of a motor vehicle, said device being characterized in that it comprises means for generating a control signal for the acquisition periods of the position sensor when the vehicle is stationary, the frequency of said signal increasing when a change in the position of said steering wheel is detected.

In addition to the main features that have just been mentioned in the above paragraph, the device according to the invention may have one or more additional features mentioned below, considered individually or in all the possible technical combinations:

said means for generating a control signal generate a signal at a standby frequency suitable for detecting a half-turn of a rotor;
said standby frequency is between 500 Hz and 1000 Hz;
said means for generating a control signal generate a signal at an active frequency that is strictly higher than said standby frequency when said position sensor detects a rotary movement of said steering wheel;
said means for generating a control signal generate a signal at a frequency changing proportionally with an acceleration or a deceleration of the rotation speed of said steering wheel;
said means for generating a control signal reduce said active frequency to reach said standby frequency when:
said position sensor detects a deceleration of the rotation speed of said steering wheel; or
said sensor detects no rotation of said steering wheel over a certain period.

The invention also relates to a power-steering system for a motor vehicle, characterized in that it comprises at least:
a steering column supporting at its top end a steering wheel;
a rack on which the bottom end of said steering column acts;
a power-steering motor mechanically connected to said rack;
a torque sensor associated with the steering column making it possible to measure the torque applied by the driver to said steering wheel;
said system also comprises a control device as claimed in the invention making it possible to keep said position sensor alert for counting the number of half-turns or turns of a rotor of said motor by means of a reduction ratio operating on said rotor and:
on said rack; or
on said steering column.

BRIEF DESCRIPTION OF THE DRAWINGS

Other features and advantages of the invention will clearly emerge from the description that is given thereof below, as an indication and in no way limiting, of embodiments making reference to the figures appended hereto in which:

FIG. 1 is a simplified schematic representation of a steering system for a motor vehicle and of a control device according to the invention;

FIG. 2 illustrates schematically the various control signals of the position sensor generated by the control device according to the invention.

DETAILED DESCRIPTION OF THE INVENTION

For reasons of clarity, the same elements have been indicated by similar reference numbers. Likewise, only the elements that are of use for understanding the invention have been shown, without regard to scale and in a schematic manner.

FIG. 1 illustrates schematically, in order to make it easier to understand the invention, a steering system 1 for a motor vehicle which comprises:
a steering column 5 supporting at its top end a steering wheel 3 capable of being rotated by the driver of the motor vehicle;
a rack 6 on which the bottom end of the steering column 5 acts;
a power-steering motor 7 mechanically connected to said rack 6;
a torque sensor 4 associated with the steering column 5 making it possible to measure the torque applied by the driver to the steering wheel 3;
a position sensor 13;
a control device 2 making it possible to keep the position sensor 13 alert.

The position sensor 13 is meant to be a sensor making it possible to count the number of half-turns or turns of a rotor 8 of the motor 7 by means of a reduction ratio operating on said rotor and on the rack 6. This type of sensor is used in power-steering motors of the prior art but without making use of the information that can be derived therefrom.

The control device 2 receives, amongst other things, items of information from the torque sensor 4 and from the position sensor 13. Said items of information reflect respectively the torque applied by the driver to the steering wheel 3 and the position of the rotor 8.

The control device 2 also comprises means 9 for generating a control signal and a regulator 15 for controlling said means 9.

Moreover, the device 2 generates a control signal making it possible to activate the sensor 13. The sensor 13 comprises a data-storage memory 10 and a data processing module 18.

The data processing module 18 comprises:
- a position detector 16 capable of detecting an angular change of the rotor 8;
- a comparison module 11 communicating with the memory 10;
- a computing module 12.

When the vehicle is started by the driver, the sensor is supplied with power continuously by a power supply 14 such as a battery.

On the other hand, when the ignition of the vehicle is switched off, the regulator 15 regulates the frequency of the acquisition periods of the position sensor 13 so as not to adversely effect the operation of the power supply 14 of the vehicle by discharging it.

Specifically, excessive consumption by the sensor 13 when the ignition is switched off would have the effect of discharging the power supply 14. In order to protect the life of the power supply, the electrical consumption of the sensor 13 in standby mode is preferably less than or equal to 200 µA.

When the ignition of the vehicle is switched off, the regulator 15 powers the memory 10 and the means 9 for generating a control signal.

The means 9 for generating a control signal then transmit a control signal at a predetermined frequency, called the standby frequency, to the data processing module 18. The general electrical consumption of the device is thereby reduced.

The memory 10 makes it possible to store the position of the steering wheel that was detected beforehand; in other words, as soon as a change in the position of the steering wheel is detected, the information is transmitted to the memory 10 which stores this information.

In parallel, the position detector 16 makes it possible to determine at all times a change in the position of the steering wheel corresponding to at least a half-turn or a turn of the rotor 8.

Because of the reduction ratio that exists between the rack 6 and the rotor 8, it should be noted that the change in position of said rotor 8 reflects with precision and exactitude the change in the angular position of the steering wheel 3.

According to one method of implementation not shown, the reduction ratio may be situated on the steering column 5.

Therefore, when the driver turns the steering wheel 3, the detector 16 detects the number of half-turns or turns that the rotor 8 makes.

This information is transmitted simultaneously to the comparison module 11. The latter also receives items of information from the memory 10.

Therefore, the comparison module 11 compares the stored value with the detected value and then transmits these data to the computing module 12.

This computing module 12 computes the angular difference and/or the number of half-turns or turns of the rotor 8 and transmits this information to the memory 10. This information then becomes a previous data item.

Once processed by the sensor 13, these items of information are transmitted to the control device 2 and more particularly to the regulator 15.

Said device 2 also receives data from the sensor 4 for measuring torque applied by the driver to the steering wheel.

Thus, said data, obtained by the torque sensor 4 and the position sensor 13 make it possible respectively to ascertain the torque exerted by the driver on the steering wheel 3 and the angular position of said steering wheel 3.

This being so, when the torque exerted by the driver exceeds a predetermined threshold or is below said threshold, the control device 2 acts on the motor 7 which generates an assistance torque by means of the rotor 8 providing assistance in turning the steered wheels of the vehicle.

Moreover, the sensor 13 communicates with the sensor 15 when the computing module 12 detects a change in position of the rotor 8.

This regulator will thus control the means 9 for generating a control signal which will in turn generate a control signal to the data processing module 18.

As an example, FIG. 2 illustrates two examples of control signals of the module 18 for detecting change in the position of the steering wheel. These signals are pulsed-based signals, one pulse corresponding to one acquisition period during which the module 18 is "wakened" (i.e. carries out a detection).

The curve 2a is a schematic representation of the acceleration in rotation of the steering wheel 3 caused by the driver of the vehicle. FIG. 2C illustrates a first acquisition-period control signal generated by the generation means 9. This first signal has two frequencies:
- a low frequency A corresponding to the standby frequency;
- a high frequency B strictly higher than frequency A, corresponding to an active frequency.

In such an application, when no movement of the rotor 8 has been detected by the sensor 13, the module 18 receives a low-frequency signal A. This standby frequency A is suitable for wakening the sensor 13 so as not to miss a half-turn or turn of the rotor 8 when the rotor 8 changes from immobility to a phase of rotational acceleration. In order to minimize the consumption of the sensor 13 when it has detected no movement for a certain period, the standby frequency A is as low as possible.

When a rotary movement of the steering wheel 3 is detected, the means 9 transmit a control signal to the module 18 at an active frequency B strictly higher than the standby frequency A and suitable for not missing half-turns or turns when the speed of rotation of the steering wheel 3 is maximal.

This particular feature provides the sensor 13 with a characteristic of optimal consumption. Specifically, when no movement is detected, the consumption of the position sensor 13 is low and preferably less than or equal to 200 µA. Therefore, the power supply 14 is used very little.

Then, so as not to "miss" a half-turn of the rotor 8, the frequency is increased in order to move to an active frequency B making it possible to keep the module 18 alert more frequently.

Specifically, a lack of angular precision would be a handicap particularly for the steering-wheel return function provided by the current power-steering devices.

A variant, not illustrated, provided by the invention consists in:

generating a control signal of the data processing module 18 at low frequency when no rotary movement of the rotor 8 is detected by the position detector 16; and generating a continuous control signal when a half-turn or turn of the rotor 8 is detected by the module 18.

FIG. 2B illustrates an additional variant provided by the invention consisting in changing the control frequency in a manner substantially proportional to the acceleration or deceleration of the rotation speed of the steering wheel 3. For reasons of precision, it is preferable that this frequency be not below 1000 Hz.

In addition to the applications that have just been illustrated with the aid of FIG. 2, the method according to the invention may have power supply frequencies that differ from those envisaged above.

As illustrated in FIG. 2D, when no rotation is detected, the battery consumption is low. When a change in the position of the rotor is detected by the position sensor 13, the means 9 generate a control signal to the module 18 at an active frequency that is strictly higher than the standby frequency and this has the effect of increasing battery consumption. This consumption is then reduced:

when the position sensor 13 detects a deceleration;

at the end of a deceleration; or when said sensor detects no rotation for a certain period.

It will be noted that the preferred field of application of the invention is that of vehicles. The method according to the invention may be applied to any type of vehicle fitted with a power-steering system requiring low consumption in order to ensure optimal power-supply life. Accordingly, the invention can be applied to buses, cars, trucks or any other type of vehicle.

The invention claimed is:

1. A control device for controlling a position sensor configured to detect a position of a steering wheel of a motor vehicle, the control device configured to generate a control signal for acquisition periods of the position sensor when the motor vehicle is stationary, wherein a frequency of the control signal increases when a change in the position of the steering wheel is detected, wherein the control device generates the control signal for acquisition periods of the position sensor having a standby frequency suitable for detecting a half-turn of a rotor, and wherein the control device generates the control signal for acquisition periods of the position sensor having a frequency, called an active frequency, changing proportionally with a change of the rotation speed of the steering wheel.

2. The device as claimed in claim 1, wherein the standby frequency is between 500 Hz and 1000 Hz.

3. The device as claimed in claim 1, wherein the control device generates the control signal for acquisition periods of the position sensor with the active frequency that is strictly higher than the standby frequency when the position sensor detects a rotary movement of the steering wheel.

4. The device as claimed in claim 3, wherein the control device reduces the active frequency to reach the standby frequency when:

the position sensor detects a deceleration of the rotation speed of the steering wheel; or the position sensor detects no rotation of said steering wheel over a certain period.

5. An assisted steering system for a motor vehicle, comprising:

a steering column configured to support a steering wheel at a top end of the steering column;

a rack on which a bottom end of the steering column acts;

a power-steering motor mechanically connected to the rack;

a torque sensor associated with the steering column configured to measure a torque applied by a driver of the motor vehicle to the steering wheel; and a control device as claimed in claim 1, the control device being configured to keep the position sensor alert for counting a number of half-turns or turns of a rotor of the motor using a reduction ratio operating on the rotor, wherein the control device is on the rack or on the steering column.

* * * * *